United States Patent [19]

Hoberman

[11] 4,374,541
[45] Feb. 22, 1983

[54] TEMPERATURE CONTROL SYSTEM FOR CONSERVING ENERGY

[76] Inventor: Max Hoberman, 943 Prince St., Teaneck, N.J. 07666

[21] Appl. No.: 243,050

[22] Filed: Mar. 12, 1981

[51] Int. Cl.³ .................. F25B 29/00; H01H 37/72
[52] U.S. Cl. .................. 165/26; 165/11 R; 236/47; 337/361
[58] Field of Search .............. 165/11, 26; 236/78 A, 236/1 C, 47, DIG. 13; 337/12, 361, 340; 200/61.06

[56] References Cited

U.S. PATENT DOCUMENTS 1,460,128  6/1923  Hill ........................ 236/DIG. 13
3,667,539  6/1972  Sweger .................... 165/26
4,060,123  11/1977  Hoffman et al. ......... 70/57 X

*Primary Examiner*—William E. Wayner

[57] ABSTRACT

A thermostat has a temperature responsive element coupled to a pivoted arm which closes the circuits to operate temperature control apparatuses. A slotted cam with leaf spring members projecting from one end is slidably mounted to move toward or away from the pivoted arm in response to removing or replacing a weight which operates a cam follower element connected to the slotted cam. When the slotted cam is positioned away from the pivoted arm, the thermostat operates in conventional fashion. When the slotted cam is positioned toward the pivoted arm, the arm has the additional load of the leaf spring members to overcome, and the set point temperature of the thermostat is changed.

9 Claims, 3 Drawing Figures

TEMPERATURE CONTROL SYSTEM FOR CONSERVING ENERGY

BACKGROUND OF INVENTION

This invention relates to the field of temperature control systems, and more particularly to a method and system for controlling the temperature of an individual room to conserve energy without the sacrifice of occupant comfort.

It is possible to conserve substantial amounts of energy in the heating and cooling of individual rooms if the temperature in each room is allowed to go down or up in the case of heating or cooling, respectively, when the room is unoccupied. This is particularly applicable to motel and hotel rooms where such rooms may be unoccupied for relatively long periods of time. Since the periods of occupancy cannot be predetermined, it is not feasible to use automatic devices such as time-controlled thermostats to reduce room heating and air conditioning in such transient situations.

There are many possibilities for occupant-control of room temperature in a motel or hotel. The manual operation of a thermostat device by which the room occupant would be expected to adjust the temperature setting as a separate operation upon entering or leaving the room is the simplest and least expensive approach to the problem. Unfortunately, it is difficult, if not impossible, to secure the human cooperation required to make this simple approach workable. If an occupant is expected to adjust temperature-sensing equipment each time a room is entered or left, it is unlikely that such adjustment will be made as a matter of course, unless the temperature adjustment mechanism is coupled with an action done automatically upon entering or leaving the room.

There are other available alternatives which could utilize occupant actions such as insertion of the room key into the door lock, opening the door, turning on the room lights, etc., to control the room temperature conditioning equipment to conserve energy. A special box containing a key-activated mechanism could be provided to initiate the temperature change cycle when the occupant inserts the room key. All of the alternatives involving the use of equipment with automatic operation are complex, expensive, subject to failure, and frequently are inconvenient to the room occupant who does not want to enter an uncomfortable room and be bothered with special procedures in order to be assured of a comfortable environment. To justify the installation and maintenance of expensive equipment with automatic operation would require that a considerable temperature difference be programmed between conditions when the occupant is present and absent in order to make the energy savings sufficiently great.

SUMMARY OF THE INVENTION

The invention is realized in an individual room system which utilizes conventional heating and cooling equipment under the control of a wall thermostat which has been modified to have a projecting key-hook lever arm on which the room key can be hung upon entering the room and removed therefrom upon leaving the room. Hanging the room key on the hook permits the thermostat to operate normally. Removing the key from the hook alters the temperature set-point of the thermostat a few degrees, raising it in the summer and reducing it in the winter. The modification of the thermostat is relatively simple and easily accomplished within the physical limitations of most thermostat housings without the necessity of redesign.

A slotted cam with projecting leaf spring members is mounted for slidable movement toward and away from a pivoted arm which is moved in response to variations in room temperature by a temperature-sensitive bellows to initiate operation of the heating or cooling apparatus. When the room key is hung on the key hook lever arm, a cam follower moves the slotted cam away from the pivoted arm, which then follows its normal operation in response to the temperature-sensitive bellows. When the room key is removed, the cam follower moves the slotted cam toward the pivoted arm, which then encounters the additional load resistance of the projecting leaf spring members. The result is that the temperature set point of the thermostat is increased or decreased, depending upon whether the desired operation is cooling or heating.

DESCRIPTION OF THE PREFERRED EMBODIMENT

Figure 1:
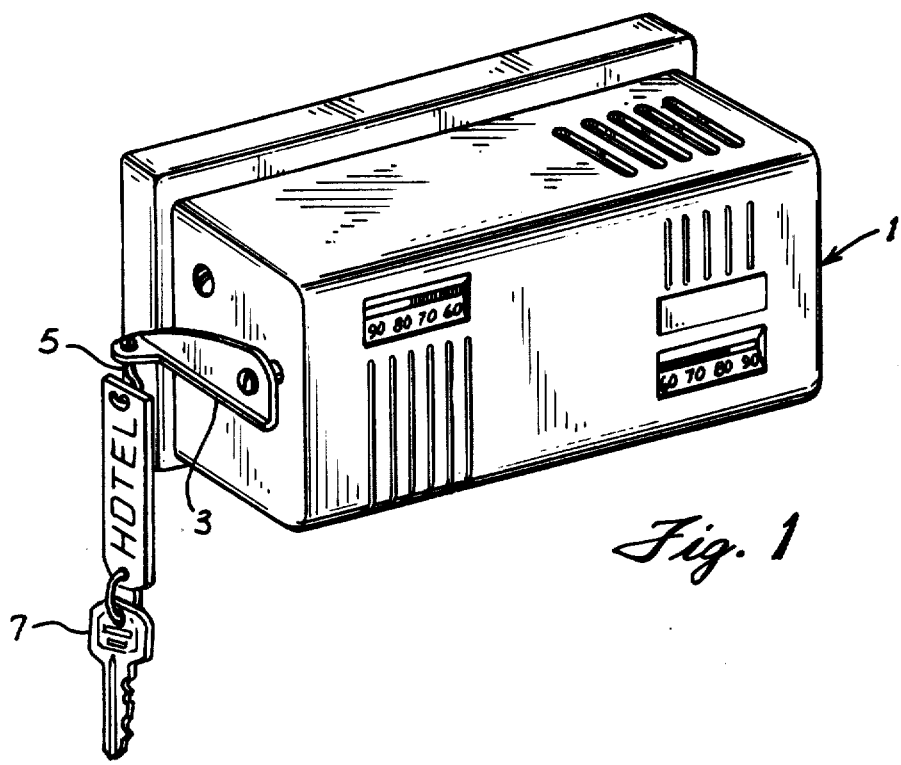
FIG. 1 is a perspective view of a wall thermostat which has been modified in accordance with the invention to have a room key removably hung therefrom.

The invention can be understood more readily by referring to the drawings in which FIG. 1 shows a wall-mounted thermostat 1 in perspective view. The thermostat 1 has been modified by the addition of a lever arm 3 having a hook 5 depending from an end portion thereof. The purpose of hook 5 is to provide a place to hang a room key 7 to produce a change in the operation of thermostat 1 in a manner to be described.

Figure 2:
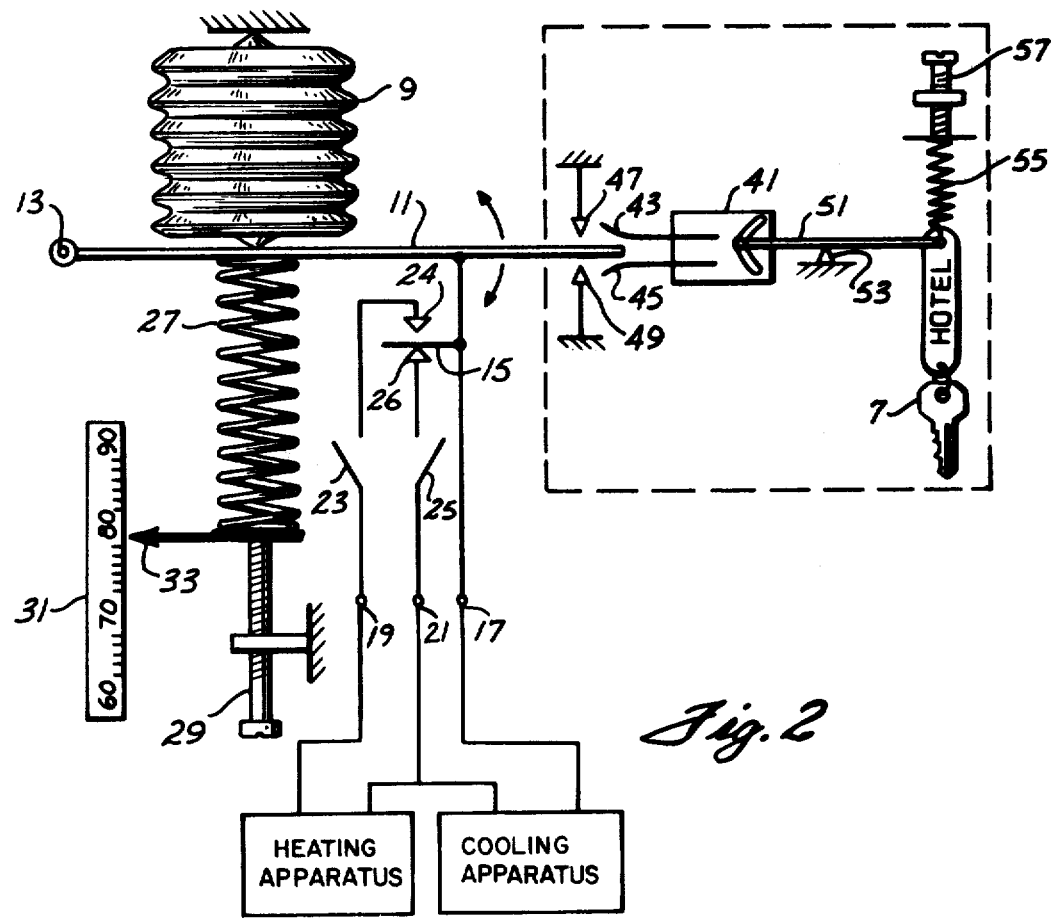
FIG. 2 is a diagrammatic view which shows the operational element of a heating and cooling thermostat in the open portion of the figure, and which shows the operational elements of the modification made in accordance with the invention within the dotted lines.

FIG. 2 is a showing of the thermostat 1. The conventional portion of the thermostat is shown in the open drawing to the left, and the modification in accordance with the present invention is shown within the dotted lines to the right of the figure. A temperature-sensitive, gas-filled bellows 9 presses against arm 11 which is pivoted for movement about point 13. Attached to arm 11 is contact member 15 which is connected to the common terminal 17 of the heating-cooling circuitry. The positive terminal for the heating circuit is shown at 19, and the positive terminal for the cooling circuitry is shown at 21. Heating selector switch 23 and cooling selector switch 25 are provided to render a dual-purpose function to the thermostat 1.

A counterbalance spring 27 serves to bias arm 11 against the bellows 9 such that any change of temperature which causes bellows 9 to expand or contract will cause a corresponding movement of arm 11. When arm 11 is moved, contact member 15 will engage or disengage from the appropriate heating or cooling contact 24 or 26, respectively, and initiate the desired compensating effect. An adjusting screw 29 is provided to change the compression of spring 27 and thereby change the temperature point at which heating or cooling actions are initiated. A temperature scale 31 and pointer 33 serve as an indicator for the temperature to be maintained.

In accordance with the present invention, the thermostat 1 is modified as shown by the structure illustrated diagrammatically within the dotted lines in FIG. 2. A slotted cam member 41 has a pair of leaf spring members 43, 45 attached thereto in such a manner that the free end of arm 11 projects into the space between the free ends of the spring members. The free ends of spring members 43, 45 project outwardly away from each other such that the distance between the spring members is a maximum at their free ends. A pair of fixed stops 47, 49 restrict the movement of arm 11 to a fixed distance in each direction so that the movement will not become excessive under large temperature variations.

The slotted cam member 41 is mounted for linear motion to the left and right as shown in FIG. 2. Motion is imparted to cam member 41 by the oscillating motion of cam follower arm 51 which has one end slidably mounted within the slot of cam member 41 and the other end adapted to have a room key 7 hung thereon. Cam follower arm 51 is pivoted at point 53. A compensating spring 55 with adjusting screw 57 is positioned such that the tension of spring 55 may be varied to accommodate keys of different weights.

It will be appreciated from the positioning of cam 41 and cam follower 51 as shown in FIG. 2 that when key 7 is hung on follower arm 51 and compensating spring 55 is adjusted to a tension such that cam follower arm 51 is horizontally balanced and extends to the leftmost part of the cam slot, then the cam 41 and leaf spring members 43, 45 are positioned as far to the right as they can go. This balanced condition is one of exact calibration, and can be repeated at any time key 7, or another object of the same weight, is hung on cam follower arm 51. It will be appreciated that the use of an object having a weight different from key 7 will produce a condition of unbalance, and the system will behave as though the room were unoccupied.

When the key 7 is removed, the cam follower arm 51 will be rotated counterclockwise about pivot point 53 and force cam member 41 to the left where leaf spring members 43, 45 will interfere with the unrestricted motion of arm 11. Arm 11 will then encounter the additional resistance of the leaf spring members, and a greater force will be required for arm 11 to move through the required distance needed for contact member 15 to activate the heating-cooling circuitry. When a greater force is required, a greater temperature differential will be necessary in order to produce the greater force. Thus by adding the structural modification shown in FIG. 2 to a conventional thermostat, the set point temperature is changed automatically by removing the key from its hanging position on the thermostat. In other words, placing a key (or other suitable object of the same weight) on the cam follower arm allows the thermostat to operate in its normal fashion, while removing the key introduces the modified thermostat structure into operation, which automatically raises the set point temperature in hot weather, and lowers the set point temperature in cold weather.

The amount of variation in the set point temperature which can be obtained is readily controlled by the selection of the material used for leaf spring members 43, 45, the spacing between the leaf spring members, and the linear movement of cam member 41 as determined by the cam slot profile.

Figure 3:
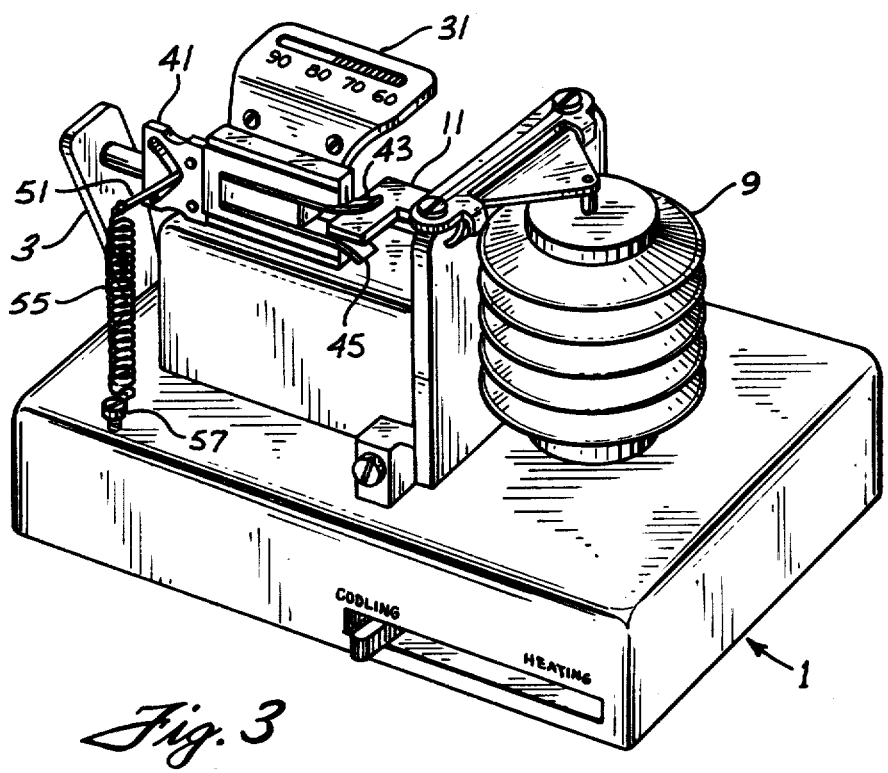
FIG. 3 is a perspective view of the thermostat shown in FIG. 1 with the cover removed.

FIG. 3 is a perspective view of the thermostat of FIG. 1 showing the cover removed to expose the structural modification of the present invention. Similar parts are given the same numerical designations as used with respect to FIG. 2. From this view, it will be seen that the structural changes necessary to incorporate the present invention into a conventional thermostat housing are minimal and are easily effected.

What is claimed is:

1. In a thermostat device for controlling heating and cooling systems having a temperature responsive element mounted to move an arm which opens and closes electrical contacts to initiate and interrupt the operation of heating and cooling apparatuses the improvement comprising
   (a) means to increase the force required to operate the arm comprising spring members which are moved into the path of motion of the arm and cause the arm to need additional force applied to produce the required motion to open and close the electrical contacts, and
   (b) means to control selectively the operation of the force increasing means, whereby the thermostat device will operate in conventional fashion when means (a) is not selected by means (b) to increase the force required to operate the arm, but whereby the thermostat device will have its set point temperature changed when means (a) is selected by means (b) to increase the operating force.

2. The combination according to claim 1 wherein means (a) further comprises a slotted cam member on which the spring members are mounted and which is mounted for linear movement toward and away from the arm.

3. The combination according to claim 2 wherein means (b) comprises a cam follower member coupled to the slotted cam member and mounted in such fashion as to move the slotted cam member slidably between positions toward and away from the arm.

4. The combination according to claim 3 wherein the cam follower member has means for detachably hanging a key connected thereto.

5. The combination according to claim 4 wherein the cam follower member has a compensating spring connected thereto with means for adjusting the tension on such spring to compensate for the weight of the key.

6. In a thermostat device for controlling heating and cooling systems having a temperature responsive element mounted to move an arm which opens and closes electrical contacts to initiate and interrupt the operation of heating and cooling apparatuses the improvement comprising
   (a) means to increase the force required to operate the arm, and
   (b) means to control selectively the operating of the force increasing means comprising a cam follower member coupled to means (a) and mounted in such fashion as to move means (a) into and out of operational engagement with the arm,
whereby the thermostat device will operate in conventional fashion when means (a) is not selected by means (b) to increase the force required to operate the arm, but whereby the thermostat device will have its set point temperature changed when means (a) is selected by means (b) to increase the operating force.

7. The combination according to claim 6 wherein the cam follower member has means for detachably hanging a key connected thereto.

8. The combination according to claim 7 wherein the cam follower member has a compensating spring connected thereto with means for adjusting the tension on such spring to compensate for the weight of the key.

9. In a thermostat device for controlling heating and cooling systems having a temperature responsive element mounted to move an arm which opens and closes electrical contacts to initiate and interrupt the operation of heating and cooling apparatuses the improvement comprising (a) means to increase the force required to operate the arm comprising spring members which are moved into the path of motion of the arm and cause the arm to need additional force applied to produce the required motion to open and close the electrical contacts, and (b) means to control selectively the operation of the force increasing means comprising a cam follower member coupled to means (a) and mounted in such fashion as to move means (a) into and out of operational engagement with the arm whereby the thermostat device will operate in conventional fashion when means (a) is not selected by means (b) to increase the force required to operate the arm, but whereby the thermostat device will have its set point temperature changed when means (a) is selected by means (b) to increase the operating force.

* * * * *